United States Patent
Patel (10) Patent No.: US 11,170,169 B2
(45) Date of Patent: Nov. 9, 2021

(54) SYSTEM AND METHOD FOR LANGUAGE-INDEPENDENT CONTEXTUAL EMBEDDING

(71) Applicant: Innoplexus AG, Eschborn (DE)

(72) Inventor: Sunil Patel, Patan (IN)

(73) Assignee: Innoplexus AG, Eschborn (DE)

( * ) Notice: Subject to any disclaimer, the term of this patent is extended or adjusted under 35 U.S.C. 154(b) by 129 days.

(21) Appl. No.: 16/369,437

(22) Filed: Mar. 29, 2019

(65) Prior Publication Data
US 2020/0311345 A1 Oct. 1, 2020

(51) Int. Cl.
| | | |
|---|---|---|
| *G06F 40/295* | (2020.01) | |
| *G06F 16/93* | (2019.01) | |
| *G06F 40/30* | (2020.01) | |
| *G06N 3/08* | (2006.01) | |
| *G06F 40/284* | (2020.01) | |
| *G06N 3/04* | (2006.01) | |

(52) U.S. Cl.
CPC ........ *G06F 40/295* (2020.01); *G06F 16/93* (2019.01); *G06F 40/284* (2020.01); *G06F 40/30* (2020.01); *G06N 3/0454* (2013.01); *G06N 3/088* (2013.01)

(58) Field of Classification Search
CPC ........ G06F 40/295; G06F 40/30; G06F 16/93; G06F 40/284; G06F 16/355; G06N 3/088; G06N 3/0454; G06N 5/022
See application file for complete search history.

(56) References Cited

U.S. PATENT DOCUMENTS

| | | | | |
|---|---|---|---|---|
| 10,504,005 | B1* | 12/2019 | Walters | G06K 9/6267 |
| 2015/0339288 | A1* | 11/2015 | Baker | G06F 40/166 |
| | | | | 704/9 |
| 2018/0165554 | A1* | 6/2018 | Zhang | G06K 9/6256 |
| 2019/0266288 | A1* | 8/2019 | Shukla | G06F 16/24578 |
| 2020/0073787 | A1* | 3/2020 | Saha | G06F 16/243 |
| 2020/0134058 | A1* | 4/2020 | Liu | G06F 16/213 |
| 2020/0210523 | A1* | 7/2020 | Aghajanyan | G06N 20/00 |

OTHER PUBLICATIONS

Heeyoul Choi, Kyunghyun Cho, Yoshua Bengio, Context-Dependent Word Representation for Neural Machine Translation, Computer Speech & Language, vol. 45, Sep. 2017, pp. 149-160. (Year: 2017).*

Gu, Shixiang, and Luca Rigazio. "Towards deep neural network architectures robust to adversarial examples." arXiv preprint arXiv:1412.5068 (2014) (Year: 2014).*

* cited by examiner

*Primary Examiner* — Angela A Armstrong
(74) *Attorney, Agent, or Firm* — Ziegler IP Law Group, LLC (57) ABSTRACT

Disclosed is a system for language-independent contextual embedding of entities in a document that includes sentences. The system has a database and a processing arrangement. The processing arrangement has a tokenizer module for tokenizing sentences to obtain tokens, an encoder module for determining character coordinate corresponding to the tokens, wherein the character coordinates corresponding to the tokens occur in a multi-dimensional hierarchical space. The system has a transmutation module for processing the character coordinates to generate contextual embeddings thereof in the multi-dimensional hierarchical space and a prediction module for memorizing sequential information pertaining to the contextual embeddings of the character coordinates.

13 Claims, 3 Drawing Sheets

SYSTEM AND METHOD FOR LANGUAGE-INDEPENDENT CONTEXTUAL EMBEDDING

TECHNICAL FIELD

The present disclosure relates generally to systems for data interpretation; and more specifically, to systems for interpreting data by employing language-independent contextual embeddings. Moreover, the present disclosure relates to methods for language-independent contextual embedding.

BACKGROUND

In recent years, artificial intelligence is increasingly used for understanding, interpretation and manipulation of languages. Specifically, such automatic manipulation of the languages, like speech, text, graphs and multi-relational data, by employing artificial intelligence is termed as Natural Language Processing (NLP). The processing of languages has found wide applicability in the day-to-day activities for deriving value and insights from vast amounts of unstructured data. The applications of such processing of the languages include named entity recognition, information extraction, information retrieval, machine translation, summarization, sentiment analysis, feedback analysis, link prediction, comparison, information extraction and so forth.

Furthermore, such processing of a language is performed by embedding of plurality of objects (for example, words, entities, concepts, and so forth) of the documents into embedding space. Typically, the embeddings of the plurality of objects is performed to organize thereto such that the said embeddings reflect semantic and functional relations between each of the plurality of objects in the documents. For establishing the semantic and functional relations between each of the plurality of objects in the language, a plurality of machine learning techniques are employed that require large amount of labelled datasets for training thereof.

Although, the embeddings of the plurality of objects into the embedding space has contributed greatly in deriving meaning of the plurality of objects from context in which they appear in the document. However, such embedding of the plurality of objects in the embedding space suffer a plurality of fundamental limitations. Specifically, the embedding of the plurality of objects into the embedding space require large dimensionality of the embedding space to model complex relations therebetween. Moreover, modelling of complex relations leads to snowball effect of errors in a component in the beginning leading to more errors in subsequent components, thereby affecting the final outcome adversely. Furthermore, large dimensionality of the embedding space is computationally demanding leading to decrease in computational efficiency of such processing systems. Moreover, reducing the dimensionality of embedding space leads to loss of information during embedding of the plurality of objects.

Additionally, such embedding of the plurality of objects are limited to a given language of the document. However, translation of the document into another language leads to large amount of loss in information owing to different lexical analogy, semantical relations and functional relations between objects of the given language and the another language. Subsequently, other activities relating to such embeddings of the plurality of objects in the document into another language such as machine translation, named entity recognition, deriving sematic relations, and so forth are affected adversely.

Therefore, there is a need to overcome the aforementioned drawbacks associated with conventional system of embedding of objects in a document into an embedding space for interpretation thereof.

SUMMARY

The present disclosure seeks to provide a system for language-independent contextual embedding of entities in a document. The present disclosure also seeks to provide a method for language-independent contextual embedding of entities in a document. The present disclosure seeks to provide a solution to the existing problem of ambiguous interpretation of data. An aim of the present disclosure is to provide a solution that overcomes at least partially the problems encountered in prior art, and provides a platform for character based contextual embedding of data thereby allowing language-independent interpretation of data.

In one aspect, an embodiment of the present disclosure provides a system for language-independent contextual embedding of entities in a document, the document comprising a plurality of sentences, wherein the system comprises:
  a database; and
  a processing arrangement communicably coupled, via one or more data communication networks, to the database, wherein the processing arrangement comprises:
    a tokenizer module for tokenizing each of the plurality of sentences of the document to obtain a plurality of tokens;
    an encoder module for determining at least one character coordinate corresponding to each of the plurality of tokens, wherein the character coordinates corresponding to the plurality of tokens occur in a multi-dimensional hierarchical space;
    a transmutation module for processing the character coordinates corresponding to the plurality of tokens to generate contextual embeddings thereof in the multi-dimensional hierarchical space; and
    a prediction module for memorizing sequential information pertaining to the contextual embeddings of the character coordinates corresponding to the plurality of tokens.

In another aspect, an embodiment of the present disclosure provides a method for language-independent contextual embedding of entities in a document, wherein the method is implemented via a system comprising a processing arrangement communicably coupled, via one or more data communication networks, to a database, the method comprising
  tokenizing, using a tokenizer module, each of the plurality of sentences of the document, to obtain a plurality of tokens;
  determining, using an encoder module, at least one character coordinate corresponding to each of the plurality of tokens, wherein the character coordinates corresponding to the plurality of tokens occur in a multi-dimensional hierarchical space;
  processing the character coordinates corresponding to the plurality of tokens, using a transmutation module, to generate contextual embeddings thereof in the multi-dimensional hierarchical space; and memorizing, using a prediction module, sequential information pertaining to the contextual embeddings of the character coordinates corresponding to the plurality of tokens.

In yet another aspect, an embodiment of the present disclosure provides a computer program product comprising non-transitory computer-readable storage media having computer-readable instructions stored thereon, the computer-readable instructions being executable by a computerized device comprising processing hardware to execute a method for language-independent contextual embedding of entities in a document.

Embodiments of the present disclosure substantially eliminate or at least partially address the aforementioned problems in the prior art, and enables reliable and error-free interpretation of information of different languages owing to character-based embeddings of the entities of the document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for language-independent contextual embedding of entities in a document, the document comprising a plurality of sentences, wherein the system comprises:
a database; and
a processing arrangement communicably coupled, via one or more data communication networks, to the database, wherein the processing arrangement comprises:
a tokenizer module for tokenizing each of the plurality of sentences of the document to obtain a plurality of tokens;
an encoder module for determining at least one character coordinate corresponding to each of the plurality of tokens, wherein the character coordinates corresponding to the plurality of tokens occur in a multi-dimensional hierarchical space;
a transmutation module for processing the character coordinates corresponding to the plurality of tokens to generate contextual embeddings thereof in the multi-dimensional hierarchical space; and
a prediction module for memorizing sequential information pertaining to the contextual embeddings of the character coordinates corresponding to the plurality of tokens.

In another aspect, an embodiment of the present disclosure provides a method for language-independent contextual embedding of entities in a document, wherein the method is implemented via a system comprising a processing arrangement communicably coupled, via one or more data communication networks, to a database, the method comprising
tokenizing, using a tokenizer module, each of the plurality of sentences of the document, to obtain a plurality of tokens;
determining, using an encoder module, at least one character coordinate corresponding to each of the plurality of tokens, wherein the character coordinates corresponding to the plurality of tokens occur in a multi-dimensional hierarchical space;
processing the character coordinates corresponding to the plurality of tokens, using a transmutation module, to generate contextual embeddings thereof in the multi-dimensional hierarchical space; and
memorizing, using a prediction module, sequential information pertaining to the contextual embeddings of the character coordinates corresponding to the plurality of tokens.

The aforesaid system for language-independent contextual embedding of entities in a document provides a platform for contextual embedding of information in a document. The system and method disclosed herein enables a user to extract relevant information from character-based contextual embedding of entities in the document, thus overcoming language barrier during interpretation of the document. Specifically, the system operates to perform character-based embedding of information in the document so as to derive a language-independent interpretation of the document. Beneficially, such language-independent interpretation of the document further enables programs equipped with artificial intelligence, employing the system, to perform a variety of operations such as named entity recognition, information extraction, information retrieval, machine translation, sentiment analysis, feedback analysis, link prediction, comparison, summarization and so forth.

Furthermore, the system disclosed herein increases efficiency of said programs equipped with artificial intelligence performing the aforesaid functions. Such increase in efficiency in terms of rum-time, computational power and reduction in loss further shows technical effect in implemented devices such as, for example, an electronic biomedical device employing a program for machine translation for translating records of patient from different languages to a given language. The system described herein contributes greatly to enhance an operation of the electronic biomedical device by enabling the programs for machine translation to operate with minimal loss thereby providing a standard output.

Beneficially, the system described herein does not merely embed information of the document in the multi-dimensional embedding space but operates to perform such embeddings on a character level. Additionally, the system is further trained to retain contextual information pertaining to the character level embedding of information in the document. Moreover, the system employs deep machine learning algorithms for training of the system, thereby reducing training time and complexity for training the system in real-time. Beneficially, the machine learning algorithms improves output of the system (namely, accuracy of interpretation of the document) by significantly improving a quality of embedding of the character coordinates determined corresponding to plurality of tokens in the document.

It will be appreciated that the system for language-independent contextual embedding of entities in a document proffers a platform to achieve a technical effect of enabling language-independent embedding of information in the document. Moreover, the aforesaid system addresses real life hinderance associated with devices operating on principle of embedding words for various applications. Typically, such devices fail to capture accurate and precise interpretation of objects in a language, for example, an abbreviation, a word, a phrase, and so on, for different languages. Subsequently, the system described herein aims to provide a solution to such existing problem related to language-dependent interpretation of information (namely, document).

The system provides a platform for solving the aforesaid problem as opposed to merely circumventing the problem. Additionally, the system enhances operational characteristics of a computer or a computing device wherein the system is implemented, such as the electronic biomedical device described hereinabove. Specifically, the performance of the computer or the computing device is optimized owing to substantial decrease in the computational power utilized by the system. Additionally, the system employs unique methodology to achieve the technical effect stated above, by training the system using machine learning algorithms. In this regard, the system addresses a crucial drawback associated with systems for interpretation of information employing embedding techniques and the use thereof by providing the aforesaid platform for overcoming embeddings of words of information.

Furthermore, the use of the machine learning algorithms to train the system provides greater efficiency, enhanced runtime, and efficient utilization of resources and computational power. Moreover, the machine learning algorithms are trained using unsupervised learning techniques, so as to train the system efficiently, without employing labeled training datasets thereby reducing human intervention in training of the system.

It will be appreciated that the aforesaid system and the aforesaid method are not limited to perform embeddings on a character-level only. Alternatively, the system and method are employed to perform embeddings of word coordinates corresponding to plurality of tokens, in the multi-dimensional hierarchical space. Moreover, the system is employed to perform language-independent contextual embedding for multiple documents stored at various locations in a single database or in a plurality of databases. The database may comprise documents obtained from one or more locations or documents provided by one or more users, wherein the user is a person or a bot that operates the aforesaid system.

Throughout the present disclosure, the term "document" refers to a file in which information is recorded, wherein the information is recorded as a data type. Some examples of various data types are text data, tabular data, image data, and so forth. Thus, the document may be in any suitable file format depending upon the data type in which the information is recorded. Moreover, the document further comprises associated attributes that relate to visual appearance thereof. In an example, the associated attribute may include a structure relating to the document such as a layout of the document, a design of the document, and so forth. In another example, the associated attributes may include a format relating to the document such as font, color, style, and so forth. Optionally, the document adheres to a subject area or a domain associated therewith. More optionally, the document may be saved as a uniquely named file in one or more databases (such as the database comprised in the system).

Furthermore, the document comprises a plurality of sentences. Typically, the "plurality of sentences" comprised in the document refers to a basic unit of language that expresses a complete idea. The idea expressed by each of the plurality of sentences relates completely or partially to the subject area or the domain associated with the document. In other words, the plurality of sentences contained in the document conveys a brief description relating to the subject area or the domain associated with the document. Additionally, optionally, the plurality of sentences follows grammatical rules and syntaxes for formation thereof.

The system comprises the database including at least one ontology. Throughout the invention, the term "database" as used herein refers to an organized body of digital information regardless of the manner in which the data or the organized body thereof is represented. Optionally, the database may be hardware, software, firmware and/or any combination thereof. Moreover, the digital information stored in the database may be in the form of a table, a map, a grid, a packet, a datagram, a file, a document, a list or in any other form. The database includes any data storage software and systems, such as, for example, a relational database like IBM DB2 and Oracle 9. Optionally, the database manages one or more memory units of a computing system, wherein the computing system implements the system for language-independent contextual embedding of entities of the document. Additionally, the database populated by data elements that comprise the digital information. Furthermore, the data elements may include data records, bits of data, cells, are used interchangeably herein and all intended to mean information stored in cells of a database.

Throughout the present disclosure, the term "entities" refer to any object in the document that needs to be modelled. Optionally, an entity is a singular, identifiable, and separate object. More optionally, the entities refer to individuals, organizations, systems, bits of data, system components, and so forth that are significant in and of themselves. Pursuant to embodiments of the present disclosure, the entities comprise plurality of objects of the document that are to be processed for understanding thereof. In this regard, the entities are recognizable concepts such as persons, places, things, events, and so forth that are comprised in the document and have relationships with other entities comprised in the document. Examples of an entity include, but are not limited to, a character, a word, a symbol, a number, a special character, an abbreviation, a mathematical operator, and a function expression.

Pursuant to embodiments of the present disclosure, the document for contextual embedding thereof, is stored in the database. Moreover, optionally, the database is further used to store interpretations drawn from the language-independent contextual embedding of the entities of the document. Additionally, optionally, the database stores a program that employs the system described in the present disclosure for operation thereof.

Optionally, the database comprises at least one ontology. It will be appreciated that a given domain comprises a set words relating to concepts, categories, and so forth of the given domain. Subsequently, an ontology from the at least one ontology defines properties associated with the set of words and relations therebetween in the given domain. Throughout the present disclosure, the term 'ontology' refers to a databank that defines knowledge pertaining to utilization of the set of words based on properties and relations, in the given domain. Specifically, the ontology describes the set of words of actuality and qualities associated with the given domain. Such as, for example, the set of words consist of at least one of: nouns, lexical verbs, adjectives, and adverbs. Moreover, optionally, the ontology includes multi-word expressions such as idiomatic expressions, phrasal verbs, jargon expressions, and other common expressions.

More optionally, the at least one ontology comprises a databank (namely, an ontology) comprising linguistic information pertaining to a given language. Such ontology enables analyzing form of the given language, meanings associated with the given language, and context associated with the given language. Additionally, optionally, such ontology comprising linguistic information further comprises lexical information. Such ontology defines relations such as semantic relation, phonetic relations, meaning relations, pragmatic relations, and so forth between the set of words relating to concepts, categories, and so forth in the given domain. Optionally, the ontology may be a general databank comprising relations between set of words comprised in one or more languages such as English, German, French, and so forth. More optionally, the ontology may be a domain specific databank comprising relations associated with the set of words comprised in a specific domain, in a specified language. In an example, the lexical ontology of a linguistic ontology is a data bank comprising relations associated with set of words associated with biomedical, in English language.

Optionally, the ontology is represented into a multi-dimensional hierarchical space (as explained in detail, herein later). In other words, the set of words comprised in the ontology is embedded in the multi-dimensional hierarchical space.

The system comprises a processing arrangement. Throughout the present disclosure, the term "processing arrangement" refers to a computational element that is operable to respond to and processes instructions that drive the system for language-independent contextual embedding of the entities in the document. Optionally, the processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term 'processing arrangement' refers to one or more individual processors, processing devices and various elements associated with a processing device that may be shared by other processing devices. Additionally, the one or more individual processors, processing devices and elements are arranged in various architectures for responding to and processing the instructions that drive the system.

The processing arrangement is communicably coupled to the database via the data communication network. Throughout the present disclosure, the term "data communication network" refers to an arrangement of interconnected programmable and/or non-programmable components that are configured to facilitate data communication between one or more electronic devices and/or databases, whether available or known at the time of filing or as later developed. Furthermore, the data communication network includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the data communication network includes wired or wireless communication that can be carried out via any number of known protocols, including, but not limited to, Internet Protocol (IP), Wireless Access Protocol (WAP), Frame Relay, or Asynchronous Transfer Mode (ATM).

The processing arrangement comprises a tokenizer module for tokenizing each of the plurality of sentences of the document, to obtain the plurality of tokens. Typically, the term "tokenizing" refers to a process of breaking a sequence of strings into smaller entities. Additionally, the smaller entities defined refers to characters, words, keywords, phrases, symbols, and so forth. The process of tokenization is performed by the tokenizer module, wherein the tokenizer module operates to determine the smaller entities for the sequence of strings. Pursuant to embodiments of the present disclosure, the document comprises the plurality of sentences (namely, the sequence of strings) to be tokenized. Furthermore, the plurality of sentences consisting the sequence of strings are tokenized into the plurality of tokens (namely, the smaller entities).

Furthermore, it will be appreciated that the "plurality of tokens" determined by the tokenizer module refers to entities such as characters, individual words, keywords, phrases, and so forth. Typically, obtaining the plurality of tokens for the document relies upon heuristic procedures. Moreover, in an example, the characters may be placed together with arithmetic operator, without white spaces, such that it appears as a single word. In such case, the arithmetic operator may be considered as a token. Furthermore, the arithmetic operator may be considered as a separator (such as, a white space).

Optionally, the tokenizer module employs the at least one ontology stored in the database of the system for tokenizing each of the plurality of sentences of the document to obtain the plurality of tokens. In this regard, an ontology is determined from the at least one ontology such that the ontology relates to a domain of the document. It will be appreciated that the ontology relating to the document is defined in terms of a language of the document. In such case, optionally, the tokenizer module operates to determine language-specific plurality of tokens for the document. Beneficially, the language-specific tokenization of the document based on the ontology enables determination of multi-word entities that carry specific meaning as a whole. Subsequently, the meaning of the multi-word entities is retained thereby preventing the system from failing due to loss of meaning of such multi-word entities.

Moreover, optionally, the tokenizer module determined the plurality of tokens based on at least one of: rules pertaining to lexeme, regular expressions, specific sequence of characters of one or more words, specific and separating characters (such as, punctuations, white spaces, and so forth). More optionally, the plurality of tokens may be made of alphabetic characters, alpha-numeric characters, or numeric characters. In an embodiment, the tokenizing module analyzes a punctuation character (such as, a period '.') and white space so as to define the plurality of tokens. In such case, the punctuation character (namely, the period '.') may denote an abbreviation, a decimal point, an ellipsis, an email-address, or an end of a sentence.

Furthermore, the system comprises the encoder module for determining at least one character coordinate corresponding to each of the plurality of tokens. The character coordinates corresponding to the plurality of tokens occur in the multi-dimensional hierarchical space. Throughout the present disclosure, the "character coordinates" refer to a location of an entity (namely, a token) in the multi-dimensional hierarchical space. Such location of the entities of the document is specified by a set of numbers, letters, symbols, or a combination thereof. It will be appreciated that each word from amongst the set of words in the ontology represented into the multi-dimensional hierarchical space have a defined location thereof. Pursuant to embodiments of the present disclosure, the encoder module determines location (namely, coordinates) relating to the plurality of tokens.

Optionally, characters of each of the plurality of tokens are encoded by assigning a fixed digit with each of the characters to determine the at least one character coordinates corresponding to the plurality of tokens. Subsequently, the coordinates for the plurality of tokens are determined on a character-level. Beneficially, determining the character coordinates corresponding to the plurality of tokens enable a contextual embedding of the document, based on the characters in the tokes. Subsequently, the contextual embedding of characters of the document further enables language-independent embedding of the document.

In an example, a token from amongst the plurality of tokens may be 'oligodendrocytes'. In such case, a location of the token in the multi-dimensional hierarchical space (namely, a character coordinate) may be defined by a set of numbers in Euclidean cartesian coordinate form such as [−0.22, 0.22, 0.221, 0.3443]. In another example, a location of the token in the multi-dimensional hierarchical space may be defined by a combination of numbers and characters in a vector form such as (−0.22x+0.22iy).

Throughout the present disclosure, the term "multi-dimensional hierarchical space" refers to an embedding space, wherein relations (in form of, paths) are established between a plurality of entities. Pursuant to embodiments of the present disclosure, the multi-dimensional hierarchical space comprises the at least one character coordinates corresponding to the plurality of tokens of the document such that relations between character coordinates is derived from embeddings of the character coordinates in the multi-dimensional hierarchical space.

It will be appreciated that the document provided to the system may be recorded in a given language, given format, and obtained from a given source. Subsequently, the document needs to be converted into a consistent form for understanding thereof. In this regard, the encoder module converts the plurality of tokens of the document into at least one character coordinates. Optionally, the at least one character coordinates are represented by way of mathematical digits. In an example, the encoder module operates to determine the at least character coordinates having defined dimensions. In such case, the at least one character coordinates may be represented in a Euclidean form having dimensions [1,10,50], wherein the dimension corresponds to represent a sentence having a maximum of 10 words and each word having a maximum of 50 characters. Additionally, in such case, appropriate padding mechanism is applied for sentences shorter than 10 words to make it 10 words. Alternatively, appropriate padding mechanism is applied for sentences longer than 10 words to cut such sentences to 10 words. Similarly, appropriate padding mechanism is used for characters.

Optionally, the encoder module further utilizes a language relating to the document to determine the character coordinates corresponding to the plurality of tokens in the multi-dimensional hierarchical space. In this regard, the language of the document enables unique identification of characters of the plurality of tokens. In an example, wherein the language of the document is 'English', each character of the plurality of tokens is encoded with regard to 256 unique characters of English. In such case, a character coordinate for a sentence is represented by a dimension size of [1, 10, 50, 256], wherein the sentence has a maximum of 10 words, each word has a maximum of 50 characters and each character is identified from the 256 unique characters of English.

The system comprises the transmutation module for processing the character coordinates corresponding to the plurality of tokens to generate contextual embeddings thereof in the multi-dimensional hierarchical space. Throughout the present disclosure, the term "contextual embedding" refers to plotting (namely, embedding) of entities in the multi-dimensional hierarchical space such that a contextual information of a given entity can be derived from a plot of the given entity. Moreover, the contextual information of the given entity is defined on the basis of plots of entities succeeding the given entity. Pursuant to embodiments of the present disclosure, the entities are the at least one character coordinates, wherein contextual information is derived from contextual embedding of each of the character coordinates to clarify a meaning thereof.

Optionally, the transmutation module processes the at least one character coordinates to reduce a size of dimension thereof. More optionally, the transmutation module processes the at least one character coordinates to generate similar features for character coordinates relating to similar tokens. Subsequently, character coordinates for similar tokens having similar features are embedded such that they are in close proximity (namely, nearness) to one another. In an example, at least one character coordinates relating to a token 'spinal cord' will have more similarity feature with another token 'spinal cord cancer'. Subsequently, embeddings of the at least one character coordinates of the token 'spinal cord' is in close proximity to embeddings of the at least one character coordinates of the token 'spinal cord cancer'.

In an example, the transmutation module in implemented by way of a convolution network. In such case, the convolution network converts the at least one character coordinates into images for processing thereof, at a character level. Such image representation of the at least one character coordinates is processed by the plurality of convolution layers (as discussed in detail herein, later). Specifically, the convolution network operates to embed the at least one character coordinates into the multi-dimensional hierarchical space, wherein each of the at least one character coordinates represent a character corresponding to the plurality of tokens. Beneficially, the convolution network enables understanding and subsequent correction of mistakes such as, for example, spelling mistakes in the document, thereby preventing failure of the system owing to inaccurate processing of the at least one character coordinates. Moreover, the convolution network applies filters to the at least one character coordinates so as to shrink dimension size thereof. Beneficially, such shrinking of the dimension size of the at least one character coordinates decrease computational effort and power required for representation (namely, embedding) of the at least one character coordinates into the multi-dimensional hierarchical space, thereby enhancing run-time of the system.

It will be appreciated that the at least one character coordinates embedded in the multi-dimensional hierarchical space have relations with one another. Furthermore, optionally, the multi-dimensional hierarchical space is represented as a tree structure. Pursuant to embodiments of the present disclosure, the term 'node' refers to a given character coordinate from amongst the at least one character coordinates corresponding to the plurality of tokens. In such case, the at least one character coordinates is represented as the tree structure (namely, a node-link structure). Typically, in the tree structure, a node includes a pointer (namely, address) to a parent node. It will be appreciated that the node may or may not have a child node. Consequently, the node may or may not include a pointer to the child node. Moreover, the node may have 0, 1, 2, 3, and so on, number of child node associated therewith. The multi-dimensional hierarchical space uses the tree structure to establish relations between the at least one character coordinates. Typically, the tree structure is instigated by a root node (namely, the starting point of the tree), wherein the root node is the highest-level node. The tree structure is terminated by leaf nodes (namely, the ending point of the tree), wherein the leaf nodes are the bottom-level nodes.

It will be appreciated that the tree structure is a general class of node-link structure. Furthermore, the system and method described in the present disclosure may be implemented so as to support alternative node-link structures.

Optionally, embedding of the at least one character coordinates in the multi-dimensional hierarchical space, organizes (namely, sorts) the character coordinates such that the multi-dimensional hierarchical space reflects semantic and functional relations (such as, similarity) amongst the at least one character coordinate corresponding to the plurality of tokens. More optionally, a distance between a given character coordinate from remainder of character coordinates (or, a length of a path between the given character coordinate from remainder of the character coordinates), defines relation of the given character coordinate with the remainder of the character coordinates. The relations further reflect homophily properties associated with each of the at least one character coordinates, found in real-world networks.

Optionally, the multi-dimensional hierarchical space is a hyperbolic hierarchical space. Specifically, the hyperbolic hierarchical space represents the at least one character coordinates by way of a hyperbolic geometry structure that may be modeled in two-dimensions.

Throughout the present disclosure, the term "machine learning algorithms" refer to a category of algorithms employed by a software application. The machine learning algorithms allows the software applications to become more accurate in predicting outcomes and/or performing tasks, without being explicitly programmed. Typically, the software application is a set of instructions executable by a computer or other digital system so as to configure the computer or the digital system to perform a task. Specifically, the machine learning algorithms are employed to artificially train the software applications so as to enable them to automatically learn, from analyzing training dataset and improving performance from experience, without being explicitly programmed.

Optionally, the software application, employing the machine learning algorithms, is trained using a training dataset. More optionally, the software application may be trained using different types of machine learning algorithms, depending upon the training dataset employed. Typically, examples of the different types of machine learning algorithms, depending upon the training dataset employed for training the software application comprise, but are not limited to: supervised machine learning algorithms, unsupervised machine learning algorithms, semi-supervised learning algorithms, and reinforcement machine learning algorithms. Furthermore, the software application is trained by interpreting patterns in the training dataset and adjusting the machine learning algorithms accordingly to get a desired output.

Optionally, the transmutation module employs machine learning algorithms. The machine learning algorithms enable the transmutation module to analyze a training dataset and further adapt thereto, so as to accurately embed the at least one character coordinates into the multidimensional hierarchical space.

The term "unsupervised learning techniques" refers to a learning technique employed by the machine learning algorithms to train the software applications using unlabeled training dataset or unstructured training information. Specifically, the training dataset employed for training the software application using unsupervised learning techniques is neither classified nor labeled. More specifically, the unsupervised learning techniques employ unsupervised machine learning algorithms that are not trained with a desired output. Alternately, the unsupervised machine learning algorithms analyze the unlabeled training dataset provided for training and further interpret the training dataset so as to sort the training data without using predefined labels.

Optionally, the transmutation module, employing machine learning algorithms, are trained using unsupervised learning techniques. In accordance with an embodiment of the present invention, the unsupervised machine learning algorithms are employed to train the transmutation module by way of unlabeled training dataset. The transmutation module is trained to perform complex analysis onto the at least one character coordinates for embedding thereof. Beneficially, the unsupervised learning techniques employ unlabeled training dataset thereby saving time required for labelling the dataset.

Furthermore, optionally, examples for unsupervised machine learning algorithms employed for unsupervised learning of an inherent structure relating to the training dataset, without using explicitly-provided labels include, but not limited to: k-means clustering, k-NN, Dimensionality Reduction, Singular Value Decomposition, Distribution models, Hierarchical clustering, Mixture models, Principal Component Analysis, and autoencoders.

Optionally, the unsupervised learning techniques operate by combining substantially large examples of training datasets to train the unsupervised machine learning algorithms. Moreover, the unsupervised machine learning algorithms enable the transmutation module to identify trend of embedding the at least one character coordinates in the document. More optionally, the unsupervised machine learning algorithms may create a data bank so as to store an interpretation or analysis relating to the training dataset provided for training the machine learning algorithms. Furthermore, the unsupervised machine learning algorithms may refer the data bank to embed an input data or a new training dataset.

In an embodiment, the transmutation module employs autoencoder model to process the at least one character coordinates in the document. It will be appreciated that the autoencoder consists of two parts, namely, an encoder and a decoder. Furthermore, a given sentence in a training dataset is a sequence of tokens, wherein each token has associated at least one character coordinates. The autoencoder model takes the sequence of character coordinates comprising the plurality of tokens of the document and learns to produce another sequence of character coordinates that is substantially similar to the sequence of character coordinates comprising the given sentence. Subsequently, the autoencoder model analyzes the semantic and syntactic structure of the at least one character coordinates of the given sentence thereby enhancing the output data.

In an autoencoder model, the encoder is operable to analyze character coordinates of the sequence of tokens comprising the given sentence to determine embedding thereof. Moreover, the encoder analyzes the character coordinates of tokens neighboring to a given character coordinate to obtain sequential information for the document. Furthermore, the decoder analyzes the embedding of the at least one character coordinates of the tokens so as to recreate the character coordinates therefrom. Specifically, the decoder tries to learn from the embeddings of the character coordinates in the multi-dimensional hierarchical space, with minimum recreation error.

Furthermore, optionally, upon the training of the autoencoder model on a training dataset, the decoder is chopped off. In other words, after training the unsupervised machine learning algorithms using the unlabeled training dataset, the decoder is removed thereby leaving encoder for further training the encoder module for specific learning tasks. In an example, the specific learning tasks are performed by employing supervised machine learning algorithms. It will be appreciated that the supervised machine learning algorithms are trained using labeled training datasets. Examples of the specific learning tasks include, but are not limited to, language-independent document classification, summarization, and named entity tagging. Beneficially, the transmutation module optimally performs such language related tasks owing to prior unsupervised training of the machine learning algorithms employed by the transmutation module. Subsequently, the supervised training of the machine learning algorithms of the transmutation module is performed with small amount of labelled data thereby substantially decreasing human effort required for supervised training of machine learning algorithms.

Optionally, an unlabeled training dataset for the transmutation module includes a first set of existing publications. Typically, unlabeled training dataset do not have a desired output and no means for guidance (such as, feedback) is provided to the machine learning algorithms. Furthermore, examples of the first set of existing publications may comprise, but are not limited to: novels, research papers, newsletters, journals, bulletins, factsheets, reports, summaries, portable guides, and a combination thereof.

Furthermore, optionally, the transmutation module is implemented as a plurality of transmutation layers. Specifically, such plurality of transmutation layers comprise hidden layers of the transmutation module. It will be appreciated that the number of layers is determined for optimum performance of the system. More optionally, the plurality of transmutation layers has skip connection therebetween. The skip connection between the plurality of transmutation layers allows flow of information from previous output to next output without transmutation operation (namely, process). The information from the skip connection is usually merged with flow of information through the plurality of transmutation layers (namely, main flow) by applying mathematical operations such as, for example, concatenation, summation, and sigmoid function. Additionally, optionally, the skip connection between the plurality of transmutation layers is trained to transform the information flowing therethrough and transfer the information to the main flow. Beneficially, the skip connections allow unobstructed flow of the information. Moreover, the skip connection enables better generalization and training of the transmutation module. Specifically, in case of a skip connection, an output from a given transmutation layer of the transmutation module is bypassed owing to a degraded output of the given transmutation layer, thereby preventing degradation of output from the transmutation module.

Furthermore, the system comprises the prediction module for memorizing sequential information pertaining to the contextual embeddings of the character coordinates corresponding to the plurality of tokens. Typically, the prediction module operates to memorize sequential information relating to the embeddings of the at least one character coordinates thereby enabling the system to have contextual understanding thereof. Moreover, the prediction module operates to perform complex analysis onto the embeddings of the at least one character coordinates so as to memorize the sequential information on character level for the document. Optionally, the prediction module identifies a correlation (such as, a relation) between a given character coordinate and character coordinates neighboring to the given character coordinate. The sequential information memorized by the prediction module enables the system to produce language-independent contextual embedding of the document.

Moreover, optionally, the prediction module employs the machine learning algorithms. Specifically, the machine learning algorithms refer to a category of algorithms employed by the prediction module that allows the prediction module to become more accurate in memorizing the sequential information, without being explicitly programmed. It will be appreciated that the machine learning algorithms employed by the prediction module is trained using a training dataset. More specifically, the machine learning algorithms analyze the training dataset and further adapt thereto, so as to memorize sequential information for the embedding of the at least one character coordinates in the multi-dimensional hierarchical space.

More optionally, the prediction module employing the machine learning algorithms are trained using unsupervised learning techniques. As mentioned previously, the unsupervised learning techniques employ unlabeled training dataset or unstructured training information. Subsequently, the unsupervised machine learning algorithms are employed to train the prediction module by way of unlabeled training dataset. The prediction module is trained to perform complex analysis onto the embedding of the at least one character coordinates for sequential (namely, contextual) information thereof. Beneficially, the unsupervised learning techniques employ unlabeled training dataset thereby saving time required for labelling the dataset.

Optionally, the unsupervised learning techniques operate by combining substantially large examples of training datasets to train the unsupervised machine learning algorithms. Moreover, the unsupervised machine learning algorithms enable the prediction module to identify correlations between each of the at least one character coordinates in the document. More optionally, the unsupervised machine learning algorithms may create a data bank so as to store an interpretation or analysis relating to the training dataset provided for training the machine learning algorithms. Furthermore, the unsupervised machine learning algorithms may refer the data bank to interpret an input data or a new training dataset.

Optionally, an unlabeled training dataset for the prediction module includes a second set of existing publications. Typically, unlabeled training dataset do not have a desired output and no means for guidance (such as, feedback) is provided to the machine learning algorithms. Furthermore, examples of the second set of existing publications may comprise, but are not limited to: novels, research papers, newsletters, journals, bulletins, factsheets, reports, summaries, portable guides, and a combination thereof.

In an exemplary implementation, the prediction module is trained for determining sequential information for a single language. In such case, the prediction module is forced to predict at least one character coordinates successive to at least one character coordinates corresponding to a given token. Subsequently, the prediction module learns relations (for example, syntactical and sematic relation) of the language. This enables the prediction module to bring together at least one character coordinates relating to a given token and at least one character coordinates corresponding to other tokens, wherein the other tokens have similar meaning as the given token. Moreover, the prediction module learns to bring the at least one character coordinates relating to the given token to at least one character coordinates relating to another tokens, wherein the another tokens occur in proximity of the given token in sentences provided as training datasets. Furthermore, the loss score is calculated as a deviation from an ideal output of the prediction.

In another exemplary implementation, the loss score for the prediction module is calculated while training thereto for different languages (namely, a first language and a second language). It will be appreciated that the transmutation module is trained using training datasets so as to generate contextual embeddings of character coordinates relating to the first language and the second language. Subsequently, for at least one character coordinates relating to a given token in the first language, the prediction module is forced to determine at least one character coordinates relating to the given token in the second language, based on the contextual embedding of character coordinates of the second language. In an example, such at least one character coordinates relating to the given token in the second language is determined by employing cosine similarity technique. In another example, such at least one character coordinates relating to the given token in the second language is determined by employing Manhattan distance technique.

Optionally, the prediction module is trained by employing a generator-adversarial network. Specifically, the generator-adversarial network is employed for unsupervised learning of the prediction module. Typically, the generator-adversarial network trains the prediction module using unsupervised machine learning algorithms to derive random contextual information from embeddings of the at least one character coordinates relating to the training datasets (namely, unlabeled training dataset). Furthermore, the generator-adversarial network trains the machine learning algorithms of the prediction module to learn from the random contextual information derived.

It will be appreciated that the generator-adversarial network is implemented by way of a generator neural network and a discriminator neural network. The generator neural network, employing generative algorithms, create new data instances. In other words, the generator neural network creates the random contextual information by analyzing embeddings relating to the training dataset. Furthermore, the discriminator neural network employing discriminative algorithms evaluate the new data instances. In other words, the discriminator neural networks analyze the random contextual information so as to assign a score to them. Specifically, the discriminator neural networks assign a number (namely, relation score) between 0 and 1 to the random contextual information generated by the generator neural network, with 1 representing a prediction of close relation and 0 representing not related. Moreover, optionally, the discriminator provides feedback to the generator pertaining to the evaluated relation score. Consequently, the generator may generate more random contextual information belonging a desired category.

Furthermore, optionally, the prediction module is implemented as a plurality of prediction layers. Specifically, such plurality of prediction layers comprise hidden layers of the prediction module. It will be appreciated that the number of prediction layers is determined for optimum performance of the system. More optionally, the plurality of prediction layers has skip connection therebetween. The skip connection between the plurality of prediction layers allows flow of information from previous output to next output without prediction operation (namely, process). Beneficially, the skip connections allow unobstructed flow of the information. Moreover, the skip connection enables better generalization and training of the prediction module. Specifically, in case of a skip connection, an output from a given prediction layer of the prediction module is bypassed owing to a degraded output of the given prediction layer, thereby preventing degradation of output from the prediction module.

Optionally, the system further:
determines a loss score relating to the transmutation module and prediction module; and
re-trains the transmutation module and prediction module, for determining optimum language-independent contextual embedding of entities in the document.

It will be appreciated that the transmutation module, employing the machine learning algorithms is trained to determine contextual embedding of the at least one character coordinates in the multi-dimensional hierarchical space and further the prediction module is trained to memorize sequential information pertaining to the contextual embeddings. In this regard, the transmutation module and the prediction module are trained by employing unlabeled training datasets, wherein the systems are trained by determining loss score associated thereto. Specifically, the term "loss score" refers to a determined conclusion depending on a threshold loss score. In an embodiment, the loss score may range between '0' and '1'. In such case, the threshold loss score may be '0.5'. Consequently, the loss scores above the threshold loss score concludes an output by the transmutation module and/or the prediction module to be 'substantially accurate'. Conversely, the loss scores below the threshold loss score concludes the output by the transmutation module and/or the prediction module to be 'substantially inaccurate'.

It will be appreciated that the system determines measure of loss (namely, the loss core) for training the transmutation module for each contextual embedding of the at least one character coordinates into the multi-dimensional hierarchical space. Subsequently, the system determines measure of loss (namely, the loss core) for training the prediction module by forcing the prediction module to derive sequential information from contextual embedding performed by the transmutation module.

Specifically, the transmutation module and/or the prediction module concludes a result for output relating to each of the at least one character coordinates by analyzing loss scores associated therewith. Furthermore, upon realizing a difference between the output determined by the transmutation module and/or the prediction module from the unsupervised training thereof, the system allows for re-training of the machine learning algorithms of the transmutation module and/or the prediction module. In other words, in case of a discrepancy or deviation between the output determined and the unsupervised training, the system further trains the machine learning algorithms employed by the transmutation module and/or the prediction module using unsupervised learning techniques. The system re-trains the transmutation module and/or the prediction module based on the loss scores associated with outputs thereof. Specifically, the transmutation module and/or the prediction module are allowed to learn from the loss scores.

Furthermore, the loss score relating to the transmutation module is propagated back to the transmutation layers so as to enable re-training thereof and provide better output is successive operation thereof. Similarly, the loss score relating to the prediction module is propagated back to the prediction layers so as to enable re-training thereof and provide better output is successive operation thereof. It will be appreciated that as the transmutation module and the prediction module is trained, the loss score decreases per iteration. Subsequently, when the system is operated upon successful training thereof, the system generates optimum language-independent contextual embedding of entities in the document.

Moreover, the present description also relates to the method as described above. The various embodiments and variants disclosed above apply mutatis mutandis to the method.

Optionally, the method employs machine learning algorithms to train the transmutation module and the prediction module.

More optionally, the method employs training the transmutation module and the prediction module employing machine learning algorithms using unsupervised learning techniques.

Optionally, an unlabeled training dataset for the transmutation module includes a first set of existing publications and an unlabeled training dataset for the prediction module includes a second set of existing publications.

Optionally, the method further includes:
  determining a loss score relating to the transmutation module and prediction module; and
  re-training the transmutation module and prediction module, for determining optimum language-independent contextual embedding of entities in the document.

Optionally, the method employs a generator-adversarial network for training the prediction module.

Optionally, database includes at least one ontology therein.

More optionally, the method employs the at least one ontology stored in the database of the system for tokenizing each of the plurality of sentences of the document to obtain the plurality of tokens.

Optionally, the method utilizes a language relating to the document to determine the character coordinates corresponding to the plurality of tokens in the multi-dimensional hierarchical space.

In yet another aspect, an embodiment of the present disclosure relates to a computer program product comprising non-transitory computer-readable storage media having computer-readable instructions stored thereon, the computer-readable instructions being executable by a computerized device comprising processing hardware to execute a method of language-independent contextual embedding of entities in a document.

DETAILED DESCRIPTION OF THE DRAWINGS

Figure 1:
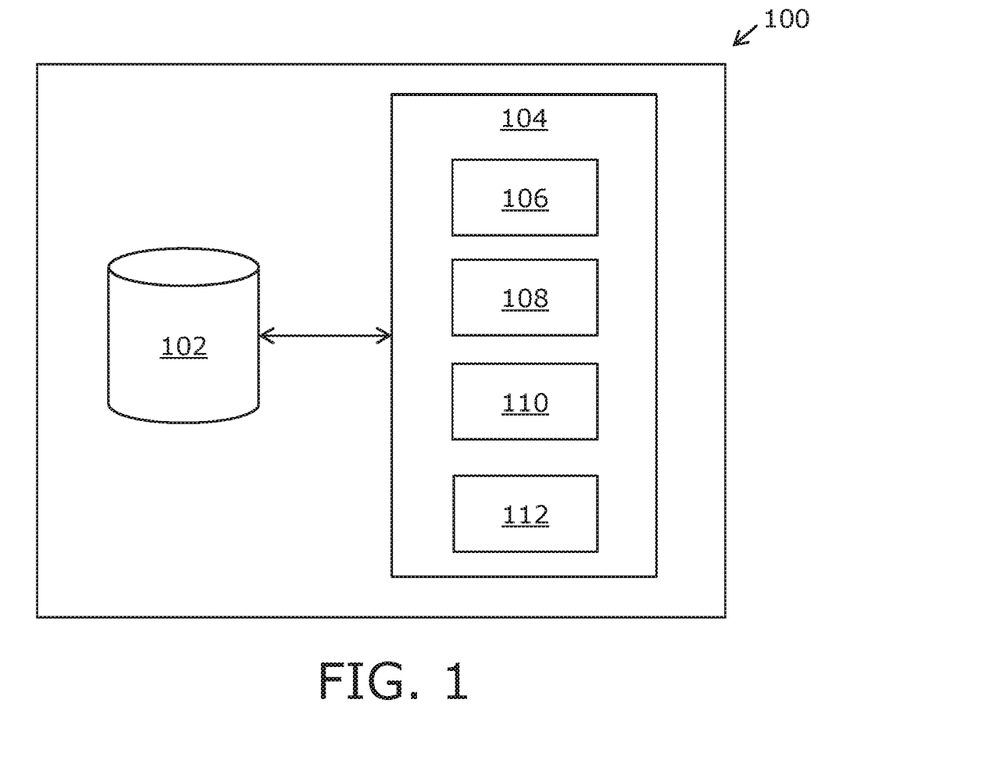
FIG. 1 is a schematic illustration of a system for language-independent contextual embedding of entities in a document, in accordance with an embodiment of the present disclosure.

Referring to FIG. 1, there is shown a schematic illustration of a system 100 for language-independent contextual embedding of entities in a document, in accordance with an embodiment of the present disclosure. Typically, the document comprises a plurality of sentences. Furthermore, the system 100 for language-independent contextual embedding of entities in the document comprises a processing arrangement 104 communicably coupled, via one or more data communication networks, to a database 102. Furthermore, the processing arrangement 104 comprises a tokenizer module 106, an encoder module 108, a transmutation module 110, and a prediction module 112. The tokenizer module 106 operates to tokenize each of the plurality of sentences of the document, to obtain a plurality of tokens. Moreover, the encoder module 108 determines at least one character coordinate corresponding to each of the plurality of tokens. The character coordinates corresponding to the plurality of tokens occur in a multi-dimensional hierarchical space. Furthermore, the transmutation module 110 processes the character coordinates corresponding to the plurality of tokens to generate contextual embeddings thereof in the multi-dimensional hierarchical space. The prediction module 112 operates to memorize sequential information pertaining to the contextual embeddings of the character coordinates corresponding to the plurality of tokens.

FIG. 1 is merely an example, which should not unduly limit the scope of the claims herein. It is to be understood that the simplified illustration of the system 100 for language-independent contextual embedding of entities in the document is provided as an example and is not to be construed as limiting the system 100 to specific numbers, types, or arrangements of the database, and the processing arrangement. A person skilled in the art will recognize many variations, alternatives, and modifications of embodiments of the present disclosure.

Figure 2:
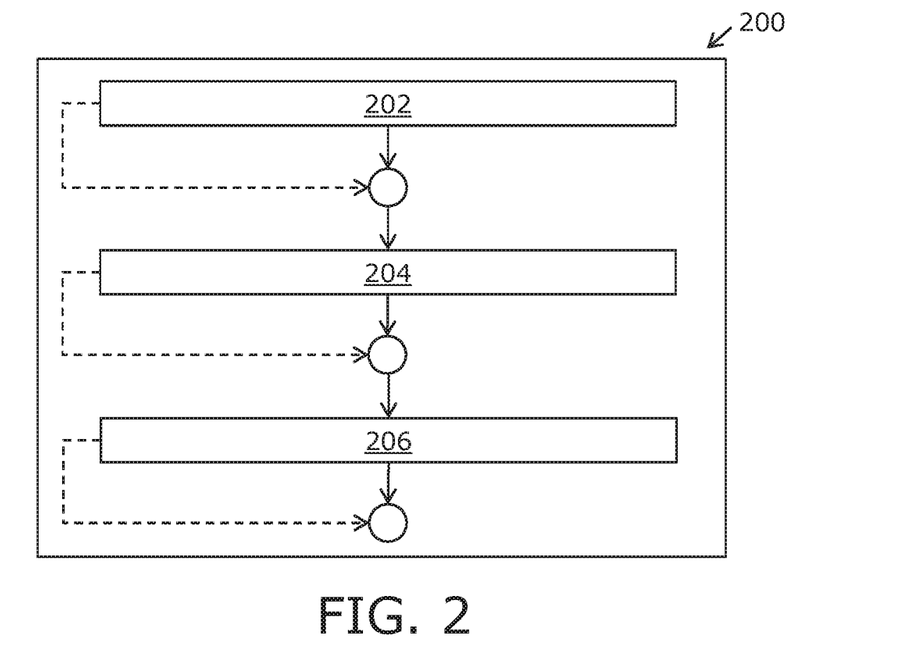
FIG. 2 is a schematic illustration of a transmutation module, in accordance with an exemplary implementation of the present disclosure.

Referring to FIG. 2, there is shown a transmutation module 200, in accordance with an exemplary implementation of the present disclosure. Specifically, the transmutation module 200 comprises a plurality of transmutation layers (depicted as transmutation layers 202, 204, and 206). Moreover, each of the plurality of transmutation layers (such as the transmutation layers 202, 204, and 206) have a skip connection therebetween. Specifically, in case of a skip connection, an output from a transmutation layer (such as, the transmutation layer 204) of the transmutation module 200 is bypassed owing to a degraded output of the transmutation layer 204, thereby preventing degradation of output from the transmutation module 200.

Figure 3:
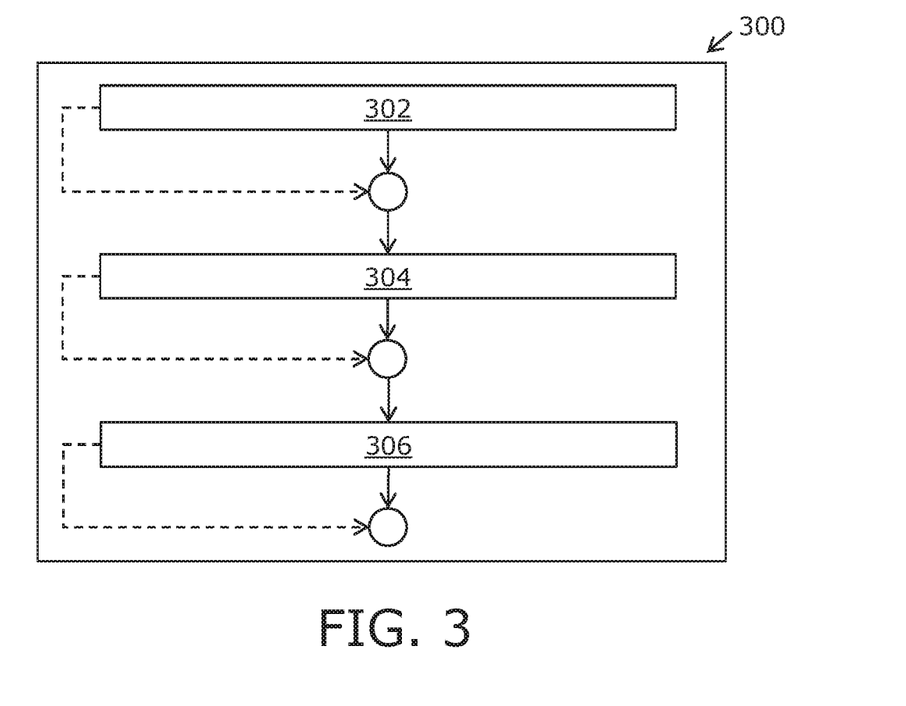
FIG. 3 is a schematic illustration of a prediction module, in accordance with an exemplary implementation of the present disclosure.

Referring to FIG. 3, there is shown a prediction module 300, in accordance with an exemplary implementation of the present disclosure. Specifically, the prediction module 300 comprises a plurality of prediction layers (depicted as prediction layers 302, 304, and 306). Moreover, each of the plurality of prediction layers (such as the prediction layers 302, 304, and 306) have a skip connection therebetween. Specifically, in case of a skip connection, an output from a prediction layer (such as, the prediction layer 304) of the prediction module 300 is bypassed owing to a degraded output of the prediction layer 304, thereby preventing degradation of output from the prediction module 300.

It may be understood by a person skilled in the art that the FIG. 2 and the FIG. 3 includes simplified illustrations of connection between the plurality of transmutation layers (depicted as transmutation layers 202, 204, and 206) in the transmutation module 200 and plurality of prediction layers (depicted as prediction layers 302, 304, and 306) in the prediction module 300, respectively, for sake of clarity only, which should not unduly limit the scope of the claims herein. The person skilled in the art will recognize many variations, alternatives, and modifications of embodiments of the present disclosure.

Figure 4:
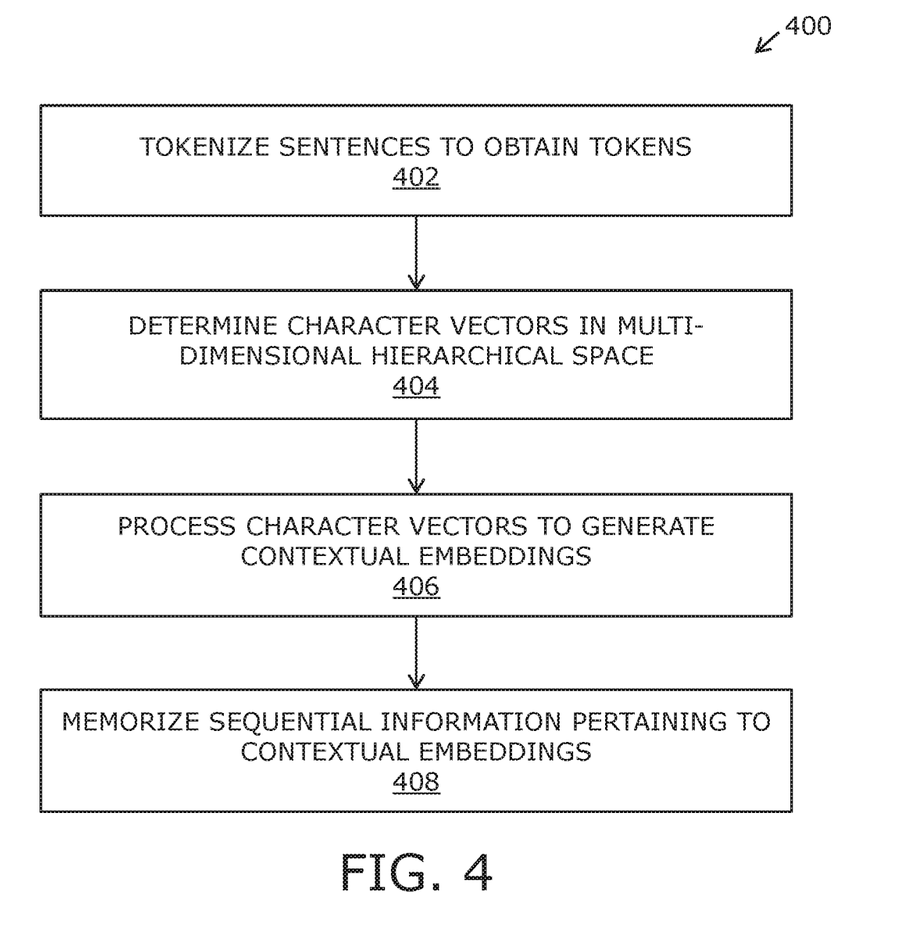
FIG. 4 is a flow chart depicting steps of a method for language-independent contextual embedding of entities in a document, in accordance with an embodiment of the present disclosure.

Referring to FIG. 4, there is shown a flow chart depicting steps of a method for language-independent contextual embedding of entities in a document, in accordance with an embodiment of the present disclosure. The method is depicted as a collection of steps in a logical flow diagram, which represents a sequence of steps that can be implemented in hardware, software, or a combination thereof, for example as aforementioned.

The method for language-independent contextual embedding of entities in the document, the document comprising a plurality of sentences, is implemented via a system comprising a database communicably coupled, via one or more data communication networks, to a processing arrangement. At a step 402, each of the plurality of sentences of the document are tokenized, using a tokenizer module, to obtain a plurality of tokens based on a language of the document. At a step 404, at least one character coordinate corresponding to each of the plurality of tokens is determined, using an encoder module. The character coordinates corresponding to the plurality of tokens occur in a multi-dimensional hierarchical space. At a step 406, the character coordinates corresponding to the plurality of tokens are processed, using a transmutation module, to generate contextual embeddings thereof in the multi-dimensional hierarchical space. At a step 408, sequential information pertaining to the contextual embeddings of the character coordinates corresponding to the plurality of tokens are memorized by the prediction module.

The steps 402, 404, 406 and 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for character based contextual embedding of entities in a document, the document comprising a plurality of sentences, wherein the system comprises:
    a database; and
    a processor communicably coupled, via one or more data communication networks, to the database, wherein the processor is configured to:
    tokenize each of the plurality of sentences of the document to obtain a plurality of tokens;
    determine at least one character coordinate corresponding to each of the plurality of tokens utilizing a language relating to the document, wherein each of the at least one character coordinate corresponding to each of the plurality of tokens occurs in a multi-dimensional hierarchical space;
    process the character coordinates corresponding to the plurality of tokens to generate contextual embeddings thereof in the multi-dimensional hierarchical space by implementing a plurality of transmutation layers, wherein the plurality of transmutation layers employ machine learning algorithm; and
    memorize sequential information pertaining to the contextual embeddings of the character coordinates corresponding to the plurality of tokens by implementing a plurality of prediction layers, wherein the plurality of prediction layers employ machine learning algorithms, wherein the plurality of prediction layers are trained by employing a generator-adversarial network, and wherein the generator-adversarial network is implemented by a generator neural network employing generative algorithms to create new data instances and a discriminator neural network employing discriminative algorithms to evaluate the new data instances.

2. The system of claim 1, wherein the plurality of transmutation layers and the plurality of prediction layers, employing the machine learning algorithms, are trained using unsupervised learning techniques.

3. The system of claim 2, wherein an unlabeled training dataset for the plurality of transmutation layers includes a first set of existing publications and an unlabeled training dataset for the plurality of prediction layers includes a second set of existing publications.

4. The system of claim 1, wherein the system further:
    determines a loss score relating to the plurality of transmutation layers and the plurality of prediction layers; and
    re-trains the plurality of transmutation layers and the plurality of prediction layers, for determining optimum character based contextual embedding of entities in the document.

5. The system of claim 1, wherein the database includes at least one ontology therein.

6. The system of claim 5, wherein the processor employs the at least one ontology stored in the database of the system for tokenizing each of the plurality of sentences of the document to obtain the plurality of tokens.

7. A method for character based contextual embedding of entities in a document, wherein the method is implemented via a system comprising a processor communicably coupled, via one or more data communication networks, to a database, the method comprising
    tokenizing each of the plurality of sentences of the document, to obtain a plurality of tokens;

determining at least one character coordinate corresponding to each of the plurality of tokens utilizing a language relating to the document, wherein each of the character coordinate corresponding to each of the plurality of tokens occurs in a multi-dimensional hierarchical space;

processing the character coordinates corresponding to the plurality of tokens to generate contextual embeddings thereof in the multi-dimensional hierarchical space by implementing a plurality of transmutation layers, wherein the plurality of transmutation layers employ machine learning algorithms; and memorizing sequential information pertaining to the contextual embeddings of the character coordinates corresponding to the plurality of tokens by implementing a plurality of prediction layers, wherein the plurality of prediction layers employ machine learning algorithms, wherein the plurality of prediction layers are trained by employing a generator-adversarial network, and wherein the generator-adversarial network is implemented by a generator neural network employing generative algorithms to create new data instances and a discriminator neural network employing discriminative algorithms to evaluate the new data instances.

8. The method of claim 7, wherein the method employs training the plurality of transmutation layers and the plurality of prediction layers employing machine learning algorithms using unsupervised learning techniques.

9. The method of claim 8, wherein an unlabeled training dataset for the plurality of transmutation layers includes a first set of existing publications and an unlabeled training dataset for the plurality of prediction layers includes a second set of existing publications.

10. The method of claim 7, wherein the method further includes:
   determining a loss score relating to the plurality of transmutation layers and the plurality of prediction layers; and
   re-training the plurality of transmutation layers and the plurality of prediction layers, for determining optimum character based contextual embedding of entities in the document.

11. The method of claim 7, wherein database includes at least one ontology therein.

12. The method of claim 11, wherein the method employs the at least one ontology stored in the database of the system for tokenizing each of the plurality of sentences of the document to obtain the plurality of tokens.

13. A computer program product comprising non-transitory computer-readable storage media having computer-readable instructions stored thereon, the computer-readable instructions being executable by a computerized device comprising processing hardware to execute a method of claim 7.

* * * * *